G. SLOAN.
HITCH FOR TRACTORS.
APPLICATION FILED SEPT. 9, 1919.
1,332,524.
Patented Mar. 2, 1920.
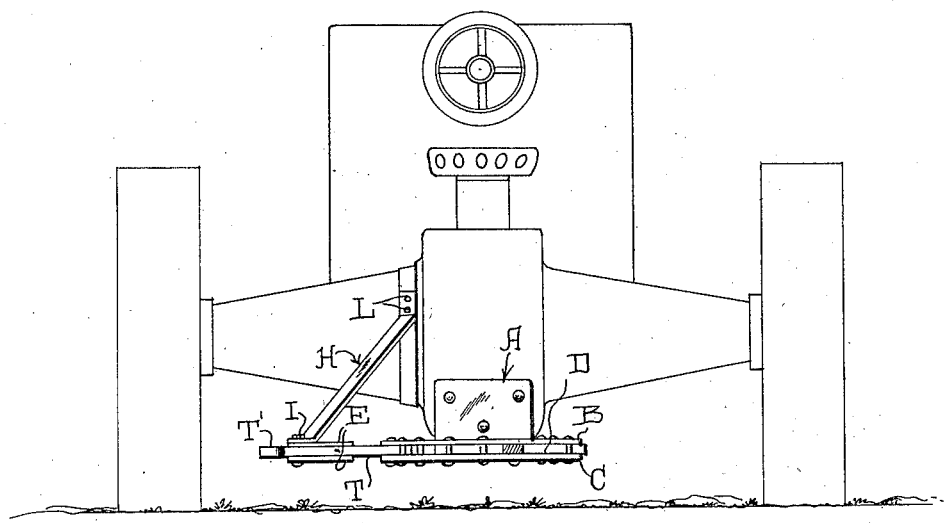
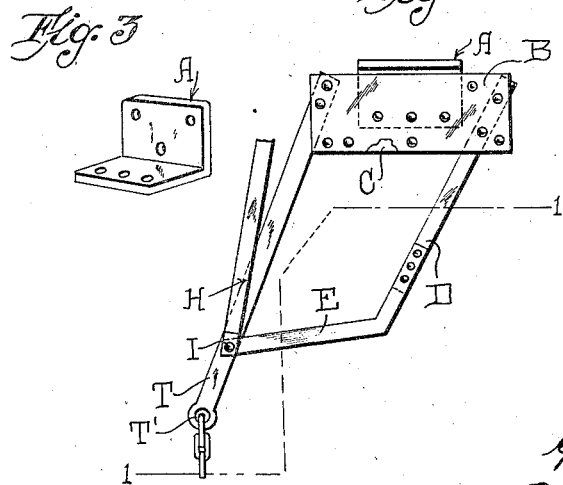
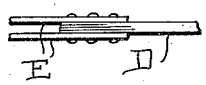
Inventor
George Sloan
By Franklin N. Hough
Attorney

UNITED STATES PATENT OFFICE.

GEORGE SLOAN, OF DERBY, IOWA.

HITCH FOR TRACTORS.

1,332,524.

Specification of Letters Patent. Patented Mar. 2, 1920.

Application filed September 9, 1919. Serial No. 322,701.

*To all whom it may concern:*

Be it known that I, GEORGE SLOAN, a citizen of the United States, residing at Derby, in the county of Lucas and State of Iowa, have invented certain new and useful Improvements in Hitches for Tractors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tractor attachments, whereby a binder may be connected to the tractor in such a way that full swath may be cut without the tractor riding down the grain, and forming also a convenient means whereby plows may be attached to the tractor.

The invention comprises further details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Figure 1 is an end elevation of the tractor showing the device applied thereto.

Fig. 2 is a detailed plan view of the attachment.

Fig. 3 is a detailed perspective view of an angle plate.

Fig. 4 is a detailed view of ends of angle bars.

Reference now being had to the details of the drawings by letter:

A designates an angled plate fastened to the frame of a tractor of any suitable type and B and C are plates which are clamped one upon either side of a horizontally projecting portion of said plate A and parallel to each other. Bolted or otherwise secured between the plates are the two bars D and T, and E designates angle bars which are riveted to bars D and also to the bar T. A brace bar H has one end held by means of a bolt I to the bar T and its other end is secured at L to the frame of the tractor at any convenient location, thereby rigidly holding the bar F in the manner shown and described.

The end of the bar T has an eye T' formed therein to which a binder, plow or other device may be attached in any suitable manner.

By the provision of an attachment embodying the features of my invention, it will be noted that same is especially designed for use in connection with binders or plows, and when a binder is attached thereto, it will be noted that a full swath of grain may be cut without the wheels of the tractor riding down the grain.

The device is so constructed that it may be easily and quickly attached to various types of tractors, the present invention being especially designed for use in connection with the Fordson type of tractor.

What I claim to be new is:

1. An attachment to tractors to which binders or plows may be connected comprising, in combination with the frame of a tractor having a laterally extending portion, plates clamped to the opposite faces of said extending portion, bars bolted between said plates and connected together at one side of the ends of the latter, to which a binder or plow is adapted to be attached.

2. In combination with a tractor having a right angled member secured thereto, plates bolted to the opposite faces of said member and projecting beyond the edges thereof, bars fastened between said plates and projecting at angles to the lengths of said plates, angle bars secured to the bars which are fastened to said plates and a brace member secured at one end to the ends of said angle bars, and its other end to frame of tractor.

In testimony whereof I hereunto affix my signature.

GEORGE SLOAN.